Figure 1:
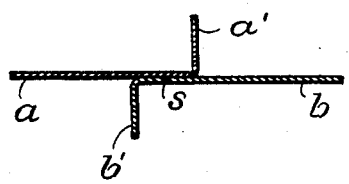

Jan. 15, 1929.  1,699,434

F. JORDAN

METHOD OF UNITING METALLICALLY THE SEAMS OF ALUMINUM
PLATED SHEET IRON, AND VESSEL MANUFACTURED
AFTER THIS METHOD

Filed Nov. 12, 1927

Inventor:
Franz Jordan

Patented Jan. 15, 1929.

1,699,434

UNITED STATES PATENT OFFICE.

FRANZ JORDAN, OF WICKEDE-ON-THE-RUHR, GERMANY.

METHOD OF UNITING METALLICALLY THE SEAMS OF ALUMINUM-PLATED SHEET IRON, AND VESSEL MANUFACTURED AFTER THIS METHOD.

Application filed November 12, 1927, Serial No. 232,920, and in Germany May 15, 1926.

This invention relates, firstly, to a method of uniting metallically the seams of aluminum-plated sheet-iron, and in the second case to the manufacture of receptacles and containers by this method. It has already been proposed to unite by soldering with the aid of particular soldering agents and fluorine-compounds the seams of articles consisting wholly of aluminum. The carrying out of these methods is attended by great difficulties, and these methods fail completely when articles of sheet-iron plated with aluminum, that is to say, articles comprising only the smallest part of aluminum, are concerned. Also the autogeneous welding of such aluminum-plated sheet-iron articles by means of an oxyhydrogen flame with the aid of certain suitable additional welding substances having iron or aluminum as a basis has proved unsuccessful.

Aluminum-plated sheet-iron can, however, be welded, according to this invention, by dispensing with the requirement that when uniting the seams with each other the aluminum layer of the iron base or body is to maintain a superficially metallic character, that is to say, in other words, if one contents oneself with obtaining on the surfaces of the seams, during the welding procedure, aluminum oxide instead of metallic aluminum. Therefore, the aluminum-plated sheet-iron is, according to this invention, heated at the seams by means of electric resistance heating, that is to say, without the aid of any particular welding substance, the degree of the heating being such that, while the aluminum is converted in known manner into aluminum oxide, the iron melts together with the aluminum oxide skin forming upon it. This method can be applied particularly advantageously to the manufacture of preserve tins and other containers hitherto made from tinned sheet-iron.

While the method is being carried through, the aluminum oxide, into which the whole of the aluminum has been converted throughout its entire thickness under the heat of the electrically heated welding tools and under the pressure of the same, enters into the then softening iron in such a manner that in spite of this condition a metallic contact is obtained and the two metals become welded to each other. It appears possible that the great affinity between the aluminum and oxygen promotes the welding procedure at the seams in so far as the oxygen required for converting the aluminum into oxide is taken at that moment from the surface of the iron at the seam in which the aluminum is converted into its oxide. It can be imagined that those particles of the iron which lie just below the aluminum oxide layer and have become soft break through this layer and melt together with it and form, thus, the metallic union of the two metals.

Regarding matters from an æsthetic point of view, the conversion of the metallic aluminum into aluminum oxide not only on the inner side of the seam, but on the outer side also, does not respond to all wishes, it is true, in that the aluminum oxide looks blackish and dull or dead, whereas the metallic aluminum looks agreeable and white; but regarding matters from a technical point of view the properties of the aluminum oxide, although known per se, present the advantages over the metallic aluminum that the oxide is affected practically not at all by organic, or by inorganic acids, is extraordinarily heat-proof, and adheres so firmly to the iron base that it protects this latter at least just as well as a metallic aluminum skin plated upon the iron.

Aluminum-plated sheet iron welded according to the present improved method is, for the reasons stated, by far to be preferred to soldered tins of tinned sheet-iron, and is also suitable for the manufacture of cheap household articles, especially mass produced articles; the method is, in fact, very important from all industrial and commercial points of view.

If preserve tins are being made of aluminum-plated sheet-iron of the kind in question, in which case the seams are not closed by means of an aluminum solder, but are subjected to the strong heat produced by an electrically heated welding burner, the aluminum is converted into oxide ($Al_2O_3$) not merely superficially, but throughout, and the oxide enters also into the seam as if metallic aluminum had been present also within the same. There arises practically a capillary union of the two metals with each other, in consequence of which the layer of the aluminum oxide adheres so very strongly to the iron base that it does not split off the latter or the two substances do not separate in any other manner even if the same are strongly bent. The contents of the tins are, therefore, by far better protected from the action of organic acids than is the case with the usual tins with seams closed by soft solder or welded and then zinced or lacquered, or with aluminum tins having soldered seams.

Where it is necessary to produce on the seams to be welded an appearance corresponding to the colour and the other exterior appearance of metallic aluminum the seam can be covered with a strip of aluminum which is united with the seam.

Figures 1–8 of the accompanying drawing show diagrammatically and by way of example some constructional forms of seams produced according to this invention.

Figure 2:
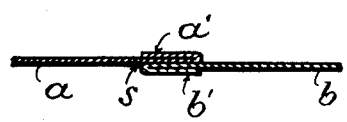

Referring to Figs. 1 and 2, *a* and *b* are two aluminum-plated strips of sheet-iron welded together autogeneously at the seam *s*. Prior to the welding the rims *a'* and *b'* (Fig. 1) have been bent off at right angles to opposite sides, and after the welding has been effected, said rims are further bent in such a manner that they cover the seam or, more precisely, cover the aluminum oxide formed by the heat of the welding burner, the oxide, the colour of which differs from that of the metallic aluminum, being thereby rendered invisible.

Figure 3:
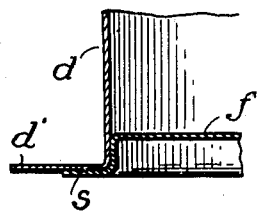
Figure 4:
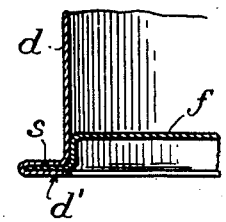
Figure 5:
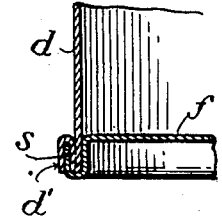

If the seams of preserve tins or similar receptacles are to be covered in the same way as just described, this is effected in the manner shown in Figs. 3–5. The wall *d* of the tin etc. is provided with a flange *d'*, the breadth of which is greater than the breadth of the flange of the cover *f*. After the cover flange has been welded to the body flange, as at *s*, Fig. 3, that is to say, after the cover has been welded to the body, first the projecting body flange portion is bent inwardly, down upon the cover flange, as in Fig. 4, and finally both flanges together are bent down upon the adjacent body portion so as to lie parallel thereto, as in Fig. 5.

Figure 6:
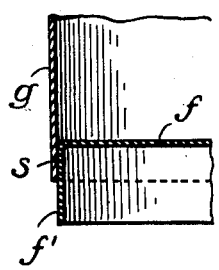
Figure 7:
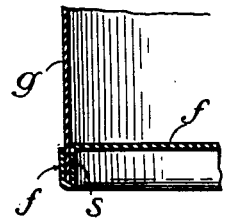
Figure 8:
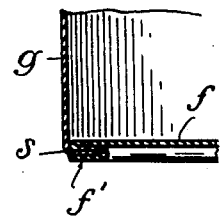

If the increase of the diameter of the preserve tin etc. at its end is not desired, the procedure can be carried through in the manner shown in Figs. 6–8, in which the cover *f* is provided with a lateral rim *f'*, the axial length of which is such that it projects beyond the edge of the preserve tin body after the cover has been welded to the same, as in Fig. 6. Now the projecting cover rim portion is bent outwardly over the edge and the rim of the body *g*, and finally these parts together are bent in the opposite direction, i. e. radially inwards, as in Fig. 8.

I claim:

1. The method of plating and uniting two portions of sheet-iron which comprises plating the sheet-iron with aluminum, electrically welding said portions without the addition of other welding materials at a temperature at which the iron melts and the aluminum is converted into aluminum oxide, and permitting the aluminum oxide to combine with molten iron to unite said portions.

2. A joint for two edge portions of sheet-iron, said sheet-iron being plated with aluminum and said edge portions being united by welding to form the joint, and a flange on each of said edge portions, said flanges being bent over the joint to cover the portions of the joint which have been oxidized during the welding operation.

In testimony whereof I affix my signature.

FRANZ JORDAN.